(12) United States Patent
Lin et al.

(10) Patent No.: US 8,508,501 B2
(45) Date of Patent: Aug. 13, 2013

(54) MULTI-FIELD SENSING OF A CAPACITIVE TOUCH PANEL

(75) Inventors: Chia-Hsing Lin, Hsinchu (TW);
Yi-Hsin Tao, Hsinchu (TW);
Hsuan-Wen Tseng, Taipei County (TW)

(73) Assignee: Elan Microelectronics Corporation, Hsinchu (TW)

( * ) Notice: Subject to any disclaimer, the term of this patent is extended or adjusted under 35 U.S.C. 154(b) by 223 days.

(21) Appl. No.: 12/861,935

(22) Filed: Aug. 24, 2010

(65) Prior Publication Data

US 2011/0050632 A1 Mar. 3, 2011

(30) Foreign Application Priority Data

Aug. 27, 2009 (TW) .............................. 98128825 A

(51) Int. Cl.
*G06F 3/045* (2006.01)
*H04N 5/228* (2006.01)

(52) U.S. Cl.
USPC ...................................... 345/174; 348/222.1

(58) Field of Classification Search
USPC .......................... 345/173, 174; 348/221, 305
See application file for complete search history.

(56) References Cited

U.S. PATENT DOCUMENTS

| | | | |
|---|---|---|---|
| 2010/0231737 A1* | 9/2010 | Yang | 348/222.1 |
| 2011/0050617 A1* | 3/2011 | Murphy et al. | 345/174 |

* cited by examiner

*Primary Examiner* — James Wozniak
*Assistant Examiner* — Kuo Woo
(74) *Attorney, Agent, or Firm* — Muncy, Geissler, Olds & Lowe, PLLC

(57) ABSTRACT

A detect method of a capacitive touch panel alternately senses the traces of the capacitive touch panel to generate two series of fields, interpolates with the first fields to obtain interpolation fields having temporal coordinates identical to that of the second fields, and combines the second fields and the interpolation fields to generate reconstructed frames for coordinate calculation. Therefore, the capacitance sensing sequence of the traces is scheduled in a multi-field way to reduce the operation of the detector circuit of the capacitive touch panel.

3 Claims, 2 Drawing Sheets

MULTI-FIELD SENSING OF A CAPACITIVE TOUCH PANEL

FIELD OF THE INVENTION

The present invention is related generally to a touch panel and, more particularly, to a detect method for a capacitive touch panel.

BACKGROUND OF THE INVENTION

A two-dimensional capacitive touch panel includes a plurality of X-traces and a plurality of Y-traces mutually intersected to form a plurality of sensors. When an electrically conductive article such as a finger approaches a sensor, the coupling capacitor between the finger and the sensor will increase the capacitance on the trace connected to the sensor, so a detector circuit can locate the finger on the capacitive touch panel by detecting the capacitance variations of the traces, and then convert the position coordinates into information for a host to perform corresponding operation.

In further detail, as shown in FIG. 1, when a finger touches the intersection point between a Y-trace Y1 and X-traces X4 and X5, the measured capacitances from those X-traces X1, X2, X7 and X8 that are far from the finger will not be affected by the finger and remain below a threshold $C_{TH}$, the measured capacitances from those X-traces X3 and X6 near the finger will be increased to slightly higher than the threshold $C_{TH}$, the measured capacitance from the X-trace X5 is even higher, and the measured capacitance from the X-trace X4 where the finger touches is at the peak of the curve 10 established by the measured capacitances from the X-traces X1-X8. Similarly, the measured capacitance from the Y-trace Y1 is at the peak of the curve established by the measured capacitances from the Y-traces, since the Y-trace Y1 is touched by the finger. Therefore, the capacitive touch panel can identify the touch point (X4,Y1). The capacitances on the X-traces X1, X2, X7 and X8 are not affected by the finger, so the measured capacitances therefrom are too low to be useful in the subsequent conversion and calculation for identification of the touch point.

To acquire a frame of information, a capacitive touch panel always scans all of its traces sequentially and combines the measured capacitances from the traces to construct a frame for locating a touch point on the capacitive touch panel. The present invention provides a novel detect method of a capacitive touch panel to reduce operation of the detector circuit of a capacitive touch panel to improve performance of the capacitive touch panel.

SUMMARY OF THE INVENTION

An object of the present invention is to provide a method for multi-field sensing of a capacitive touch panel.

According to the present invention, a detect method of a capacitive touch panel includes alternately detecting a plurality of first traces and a plurality of second traces to generate a plurality of first fields and a plurality of second fields, interpolating with the first fields to obtain interpolation fields having temporal coordinates identical to that of the second fields, and combining the second fields and the interpolation fields to generate reconstructed frames.

Preferably, the first traces are the odd-numbered traces distributed over the capacitive touch panel.

Preferably, the second traces are the even-numbered traces distributed over the capacitive touch panel.

BRIEF DESCRIPTION OF THE DRAWINGS

These and other objects, features and advantages of the present invention will become apparent to those skilled in the art upon consideration of the following description of the preferred embodiments of the present invention taken in conjunction with the accompanying drawings, in which.

DETAILED DESCRIPTION OF THE INVENTION

Figure 1:
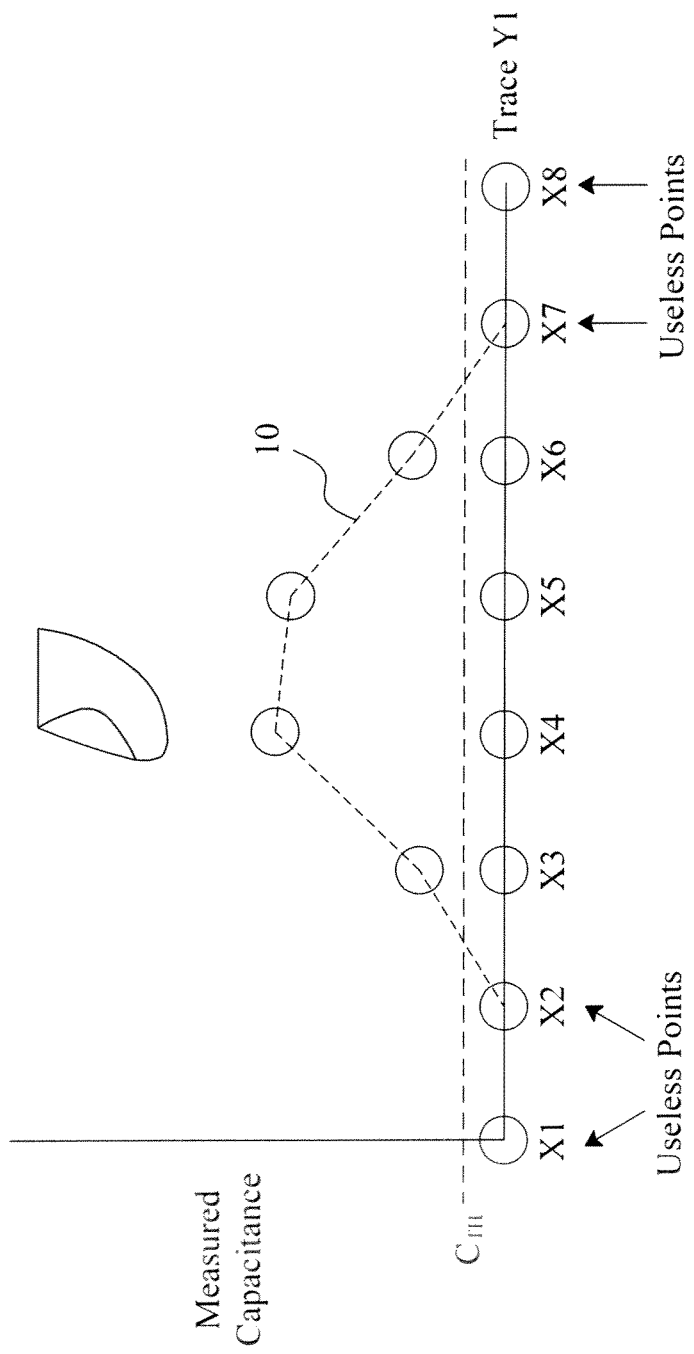
FIG. 1 is a schematic diagram showing the measured capacitances from X-traces along a Y-trace when a finger touches at the intersection of the Y-trace and one of the X-traces.
Figure 2:
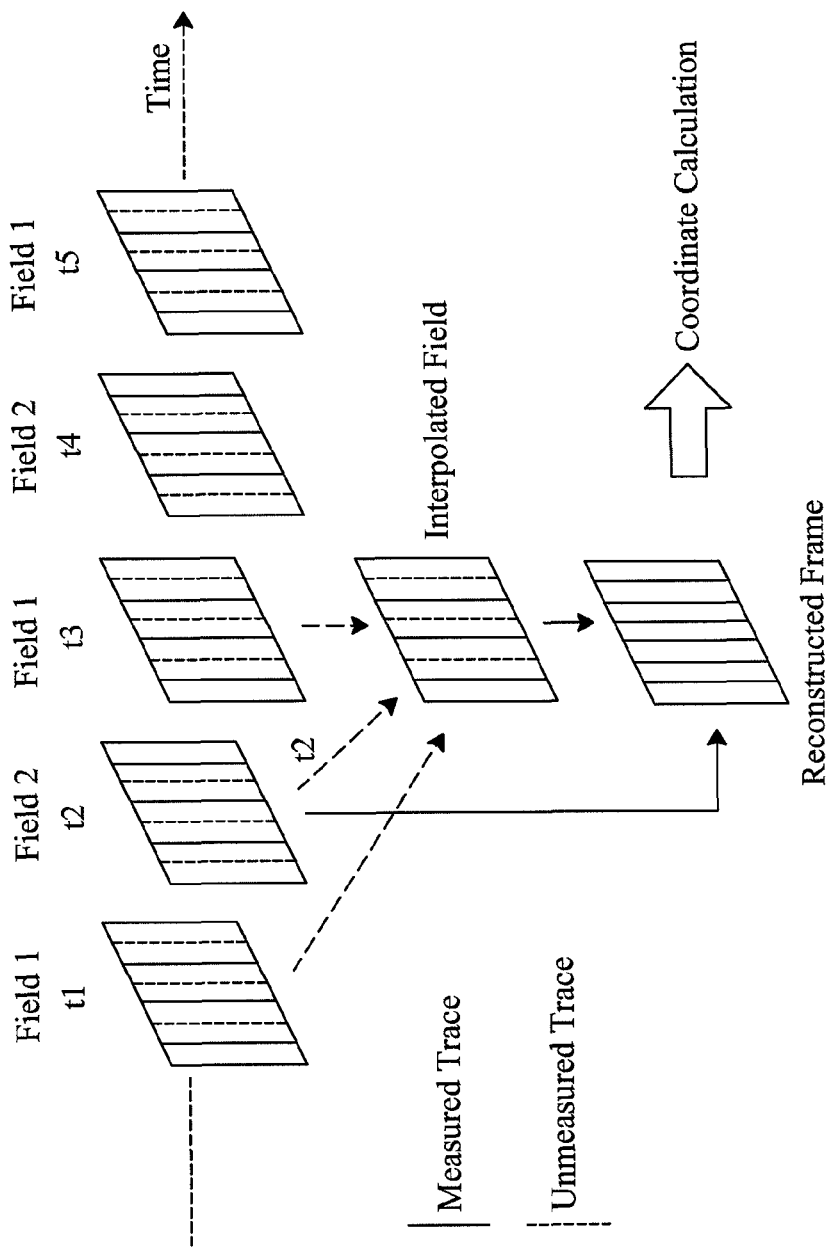
FIG. 2 is a schematic diagram of an embodiment according to the present invention.

According to the present invention, the capacitance sensing sequence of traces of a capacitive touch panel is scheduled in a multi-field way, for example trace skipping, instead of the usual frame way, i.e. sequential sensing of traces. FIG. 2 is a schematic diagram of an embodiment according to the present invention, in which the dash transverse axis represents time. Although a two-dimensional capacitive touch panel has a plurality of vertical traces and a plurality of horizontal traces, FIG. 2 only shows the vertical traces for convenience of illustration the scope and features of the present invention.

In the embodiment shown in FIG. 2, the traces of the capacitive touch panel are grouped into interleaving traces to generate two series of interleaving fields, Field 1 and Field 2. First, at a first timing, the odd-numbered traces of the capacitive touch panel are sequentially sensed to obtain a first one of the Field 1, then at a second timing, the even-numbered traces of the capacitive touch panel are sequentially sensed to obtain a first one of the Field 2, and afterward, at a third timing the odd-numbered traces are sequentially sensed again to obtain a second one of the Field 1. The time interval between the first timing, the second timing and the third timing is identical. The first and second ones of the Field 1 are interpolated to obtain an interpolation field that has a temporal coordinate identical to that of the first one of the Field 2. The first one of the Field 2 and the interpolation field are combined into a reconstructed frame for later coordinate calculation. With the same interleaving sensing procedure, a second one of the Field 2 and a third one of the Field 1 are obtained. By interpolating the second one of the Field 1 and the third one of the Field 1, a second interpolation field (not shown in FIG. 2) that has a temporal coordinate identical to that of the second one of the Field 2 is obtained. Combination of the second interpolation field and the second one of the Field 2 is performed to produce the next reconstructed frame.

In other embodiments, depending on demands, a designer may select the group of traces to be sensed in each field and modify the combination accordingly, to take ever frame apart to more fields. Therefore, three-field sensing, four-field sensing and the other multi-field sensing may be used in the detect method of a capacitive touch panel.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A detect method for a capacitive touch panel having a plurality of traces in a same direction, the detect method comprising the steps of:
   having the plurality of traces grouped into interleaving traces as a first group of traces and a second group of traces;
   alternately sensing the first group of traces and the second group of the traces in a time line, to generate a series of first fields resulting from the sensing of the first group of traces and a series of second fields resulting from the sensing of the second group of traces, such that the first and second fields are spaced with a time difference in the time line;
   interpolating the series of the first fields to obtain a series of interpolation fields and assigning temporal coordinates of the second fields to the interpolation fields; and
   combining the second fields and the interpolation fields having same temporal coordinates to generate a series of reconstructed frames for coordinate calculation.

2. The detect method of claim 1, wherein the first group of traces are odd-numbered traces distributed over the capacitive touch panel.

3. The detect method of claim 1, wherein the second group of traces are even-numbered traces distributed over the capacitive touch panel.

* * * * *